Jan. 19, 1965  W. D. WALLACE ETAL  3,166,201
RAILWAY CAR SHOCK ABSORBING SYSTEM
Filed June 10, 1963  2 Sheets-Sheet 1

INVENTOR.
William D. Wallace
Laurence T. La Belle
BY
Atty.

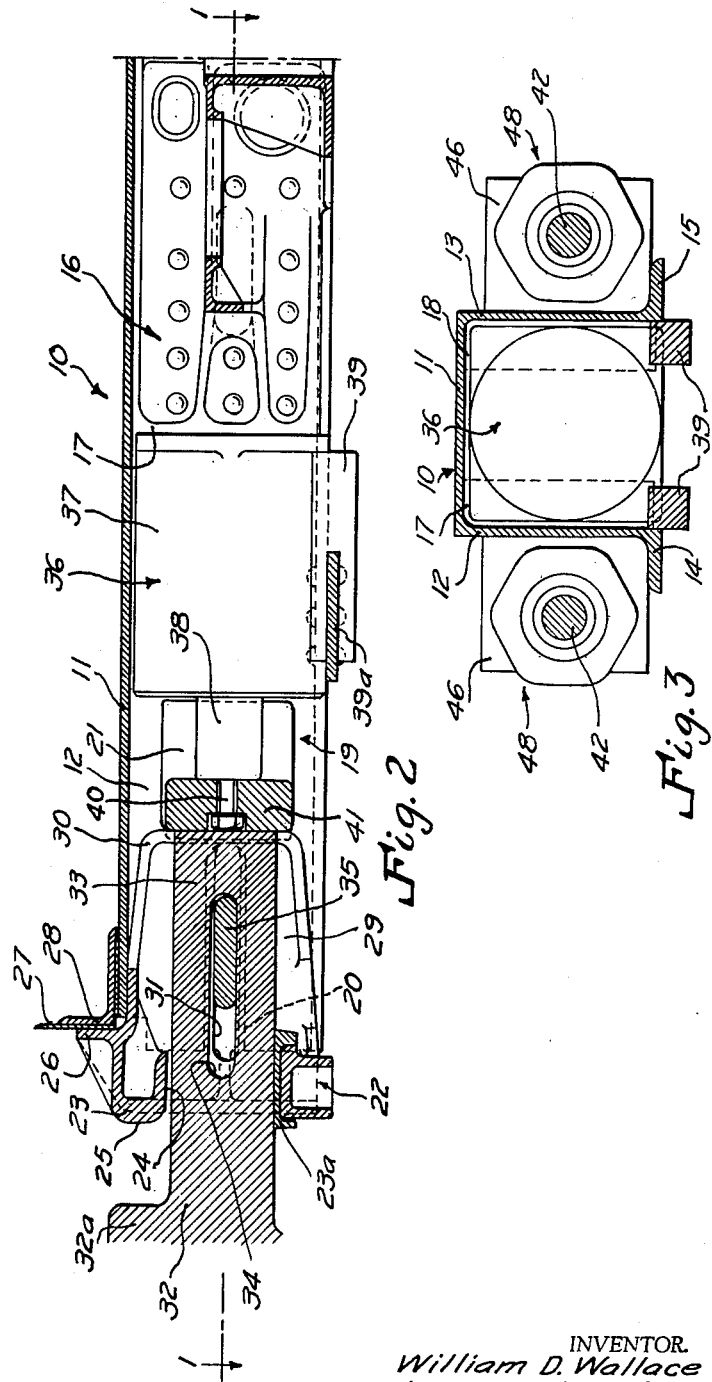

United States Patent Office 3,166,201
Patented Jan. 19, 1965

3,166,201
RAILWAY CAR SHOCK ABSORBING SYSTEM
William D. Wallace, Homewood, and Laurence T. La Belle, Westchester, Ill., assignors to W. H. Miner, Inc., Chicago, Ill., a corporation of Delaware
Filed June 10, 1963, Ser. No. 286,546
8 Claims. (Cl. 213—43)

Our present invention relates generally to railway cars and more particularly to a shock absorbing system for a railway car.

It is well known that railway cars, including freight cars, are repeatedly subjected to impact or buff forces and draft forces. For example, when railway cars are being made up into trains, the couplers impact each other during coupling thereof. Then, as the cars tend to stretch apart on starting or acceleration of the engine, the couplers are subjected to draft forces. And, when the cars tend to crowd together on deceleration or stopping of the engine, the couplers are again subjected to impact or buff forces. In these circumstances, severe stresses are set up in the couplers and undesirable substantial shocks are imparted to the cars and the contents thereof.

The primary object of our present invention is to provide an improved high capacity shock absorbing system for railway cars to absorb buff and draft forces received by the couplers of the cars.

It is another object of our present invention to provide a shock absorbing system for railway cars, as described, which is adapted to be readily installed either in existing railway cars or in new railway cars under construction.

It is still another object of our present invention to provide a shock absorbing system for railway cars, as described, wherein first shock absorbing means is arranged for absorbing shocks imparted to the couplers and second shock absorbing means is arranged for cooperation with the first shock absorbing means in absorbing such shocks.

It is a further object of our present invention to provide a shock absorbing system for railway cars, as described, wherein the first shock absorbing means comprises hydraulic shock absorber means for absorbing buff forces received by the couplers and the second shock absorbing means comprises friction draft gear means operable, either in conjunction with the hydraulic shock absorber means or independently thereof in the event of failure of the latter, to absorb such forces.

It is a still further object of our present invention to provide a shock absorbing system for railway cars, as described, wherein the hydraulic shock absorber means serves to absorb buff forces received by the couplers and the friction draft gear means serve to absorb both buff and draft forces received by the couplers.

To accomplish the foregoing objects in connection with each coupler of a railway car having a center sill, we propose to arrange a hydraulic shock absorber within the center sill and friction draft gears along either side of the center sill. Through the suitable provision of force transmitting means, the coupler, the hydraulic shock absorber and the friction draft gears are operatively associated in such a manner that buff forces received by the coupler are absorbed by both the hydraulic shock absorber and the friction draft gears and draft forces are absorbed by the friction draft gears. This arrangement of a hydraulic shock absorber and friction draft gears results in an improved high capacity shock absorbing system that is compatible with both existing railway cars and new railway cars under construction.

Now, in order to acquaint those skilled in the art with the manner of constructing and using shock absorbing systems in accordance with the principles of our present invention, we shall describe in connection with the accompanying drawings a preferred embodiment of our invention.

In the drawings:

FIGURE 2 is a longitudinal sectional view, taken substantially along the line 2—2 in FIGURE 1, looking in the direction indicated by the arrows; and FIGURE 3 is a transverse sectional view, taken substantially along the line 3—3 in FIGURE 1, looking in the direction indicated by the arrows.

Figure 1:
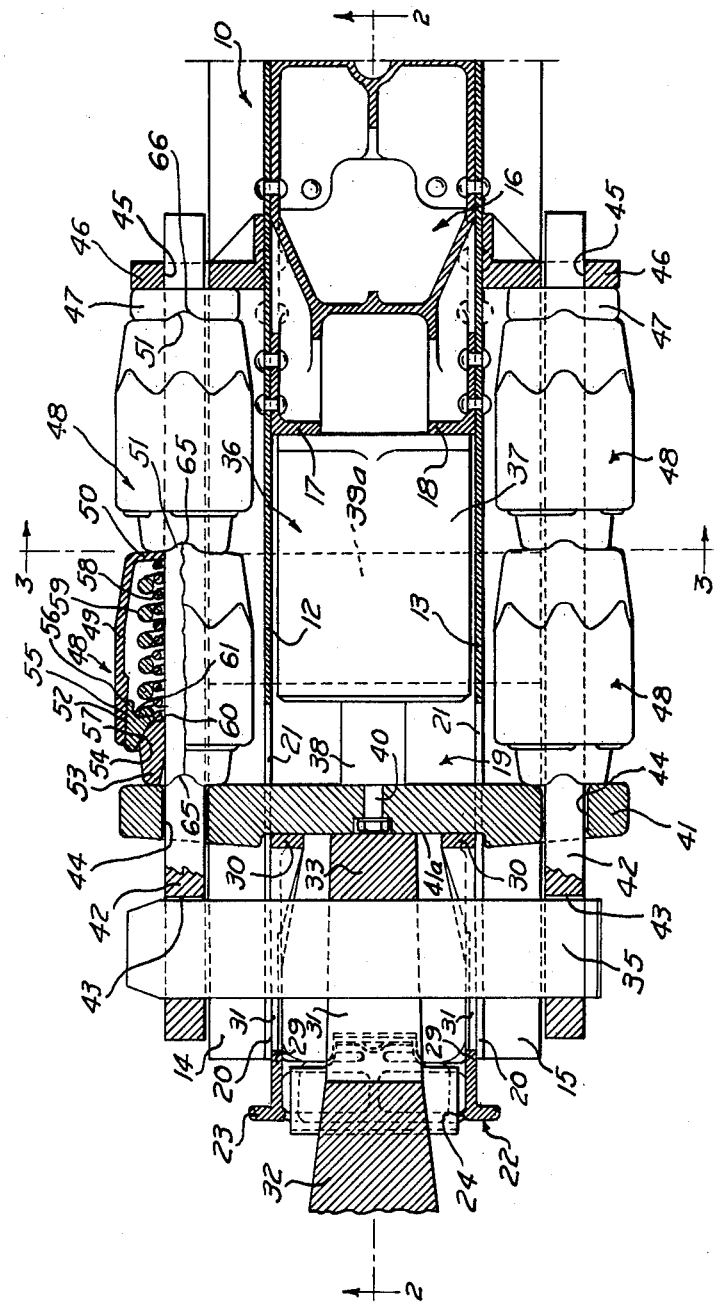
FIGURE 1 is a horizontal sectional view of the shock absorbing system of our present invention, taken substantially along the line 1—1 in FIGURE 2, looking in the direction indicated by the arrows, with certain portions being shown in elevation.

Referring now to the drawings, there is indicated generally by the reference numeral 10, one end of the longitudinally extending, inverted, generally U-shaped, center sill of a railway car. The center sill 10 is stationary relative to the railway car and comprises an upper horizontal wall portion 11 and vertical side wall portions 12 and 13. Extending along the lower longitudinal edges of the vertical walls 12 and 13 of the stationary sill 10, as shown in FIGURE 3, are laterally outwardly directed flange portions 14 and 15. Suitably secured, as by rivets, to the vertical side walls 12 and 13, at a distance spaced inwardly of the forward ends thereof, is a frame member 16 having forward laterally inwardly extending arm portions 17 and 18. The center sill 10 serves to define the usual draft gear pocket 19 that is open at the forward end and effectively closed at the rearward end by the frame member 16. At the forward end of the draft gear pocket 19, each sill side wall 12 and 13 is formed with a longitudinally extending slot 20 that is open at its forward end; and intermediate of the ends of the draft gear pocket 19, each sill side wall 12 and 13 is formed with a generally rectangular opening 21. The slots 20 and the openings 21 are adapted to slidably receive members to be described hereinafter.

Suitably secured, as by welding or the like, in the front end of the sill 10 is a frame assembly 22 having a forwardly projecting collar portion 23 that serves to define a generally rectangular opening 24 aligned with the longitudinal axis of the sill 10. The forward upper vertical surface of the collar portion 23 presents a transverse shoulder 25. The collar portion 23 adjacent its rear end is formed with an integral vertically extending transverse flange portion 26 that abuts a vertical spacer plate 27 at the forward end of an angle flange 28 suitably secured to the upper horizontal wall portion 11 of the sill 10. The frame assembly 22 further comprises a pair of rearwardly extending transversely spaced side leg portions 29 having laterally inwardly extending generally vertical flange portions 30 at the rear end thereof. The side leg portions 29 are formed with longitudinally extending slots 31 that are in general alignment with the slots 20 in the sill side walls 12 and 13. A transverse bearing channel member 23a is disposed along the lower margin of the collar opening 24.

Also arranged at the forward end of the stationary sill 10 is a coupler member 32 having a vertically extending enlarged or abutment portion 32a and a rearwardly extending shank portion 33 that projects through the collar opening 24. The shank portion 33 rests on the channel member 23a and is formed with a transverse slot 34 through which extends a transverse draft key 35. The ends of the draft key 35 project through the slots 20 and 31 in the sill side walls 12 and 13 and the side leg portions 29 of the frame assembly 22. The draft key 35 is retained in position transversely by conventional locking pins (not shown). Within limits and in a manner to be described more fully hereinafter, the coupler member 32 and the draft key 35 are adapted to move back and forth within the stationary sill 10 in response to buff and draft forces applied to the coupler 32.

To absorb buff and draft forces received by the coupler 32, we provide complementary forms of shock absorber means. One form of shock absorber means comprises a longitudinally extending hydraulic shock absorber unit, indicated generally by the reference numeral 36, which is arranged within the draft gear pocket 19. The hydraulic shock absorber unit 36 is of conventional construction and comprises a cylinder 37 and a piston rod 38. The hydraulic cylinder 37 is supported by spaced bars 39 and a transverse strap member 39a suitably secured, as by rivets, to the lower surfaces of the sill flanges 14 and 15. The rear closed end of the hydraulic cylinder 37 is secured in abutment with the forward faces of the arm portions 17 and 18 of the frame member 16; and the forward end of the piston rod 38 has secured thereto, as by a bolt 40, a transversely extending force transmitting member or follower 41 which is slidably received in the openings 21 in the sill side walls 12 and 13. In the neutral position of the shock absorbing system of our present invention, the forward recessed face 41a of the follower 41 abuts the rear faces of the frame assembly flanges 30 and the rear end of the coupler shank 33.

Cooperating with the above-described hydraulic shock absorber unit 36 is a second form of shock absorbing means comprising friction draft gear means arranged on opposite sides of the hydraulic unit 36 outwardly of the stationary sill 10. Extending longitudinally along the outboard sides of the sill walls 12 and 13, as shown in FIGURE 1, are force transmitting means comprised of a pair of drawbars 42. Each of the drawbars 42 at its forward end is slotted, as at 43, to receive the adjacent outer end of the draft key 35, and intermediate of its ends projects through an opening 44 in the adjacent end of the follower 41. The rear end of each drawbar 42 is slidably mounted in an opening 45 formed in a bracket member 46 suitably secured to the outboard side of the adjacent sill side wall. The bracket members 46 serve as reaction and support means. Secured to each drawbar 42 immediately forwardly of the bracket 46 is a force transmitting element or radial flange 47. Disposed concentrically about each drawbar 42 intermediate of the rear face of the follower 41 and the forward face of the flange 47 are a pair of friction draft gear units each indicated generally by the reference numeral 48.

Each draft gear unit 48 comprises a friction casing 49, open at one end, and closed at the other end by a transverse wall 50. The wall 50 is slidably mounted on the drawbar 42 and has boss portions 51 projecting axially therefrom. The walls at the open end of the casing 49 are formed so as to present a plurality of flat interior, inwardly tapering, friction surfaces 52. The draft gear 48 further comprises a generally annular wedge block 53 slidably mounted on the drawbar 42 and having a plurality of circumferentially spaced exterior wedge faces 54. Disposed intermediate of the casing 49 and wedge 53 are a plurality of circumferentially spaced friction shoes 55 each having an exterior wedge face 56 and an interior wedge face 57 cooperating respectively with the adjacent friction surfaces 52 and wedge faces 54. Located within the casing 49 are a light inner coil spring 58 and a heavier outer coil spring 59. The opposite ends of the inner coil spring 58 bear, respectively, on the inner side of the casing end wall 50 and the inner end face 60 of the wedge block 53, and the opposite ends of the outer coil spring 59 bear, respectively, on the inner side of the casing end wall 50 and the spring seats 61 of the friction shoes 55. To prevent rotation of each pair of friction draft gears, the boss portions 51 of the forward casing 49 are received in recesses 65 formed in the wedge 53 of the rear draft gear 48, and the boss portions 51 of the rear casing 49 are received in recesses 66 formed in the flange member 47. For further details concerning the construction and operation of the draft gears 48, reference may be had to Patent No. 2,403,585, issued on July 9, 1946, to George E. Dath and Roland J. Olander.

When the coupler 32 is not being subjected to either buff or draft forces, our shock absorbing system assumes the neutral position illustrated in the drawings. We shall now describe the manner in which our system cushions both buff and draft forces applied to the coupler 32.

When the coupler member 32 is subjected to impact or buff forces, the inner end of the shank portion 33 engages the forward surface of the transverse follower 41 and moves the latter, together with the hydraulic piston rod 38, rearwardly. Since the rearward end of the hydraulic cylinder 37 is seated against the stationary arm portions 17 and 18 of the frame member 16, rearward movement of the piston rod 38 actuates the hydraulic shock absorber unit 36 whereupon the latter serves to absorb the buff forces applied to the coupler 32.

The follower 41 during rearward movement also serves to axially compress the draft gears 48 against the radial flanges 47 and brackets 46. That is, as the transverse follower 41 moves rearwardly, the wedge blocks 53 of the forward draft gear units 48 are pushed inwardly of the associated casings 49 by the follower 41, and the wedge blocks 53 of the rear draft gear units 48 are pushed inwardly of the associated rear casings 49 by the forward casings 49. In the case of each unit, due to wedging engagement between the wedge block 53 and the associated friction shoes 55, the shoes 55 are forced apart against the friction surfaces 52 of the casing 49 and are carried inwardly along these friction surfaces. Inward movement of the wedge 53 is resisted by the spring 58 and inward movement of the shoes 55 is resisted by the spring 59. The resultant combined spring and frictional resistance produced by this action in each draft gear unit 48 provides high shock absorbing capacity. As will also be appreciated, the friction draft gear units 48, when actuated in the manner described, serve to cooperate with the hydraulic shock absorber unit 36 in absorbing the buff forces applied to the coupler member 32.

In buff, the shoulder 25 at the forward end of the frame assembly collar 23 is engageable by the upstanding coupler abutment 32a for stopping and limiting rearward movement of the latter. Thus, the longitudinal spacing between the shoulder 25 and the upstanding abutment 32a when the system is in a neutral position predetermines maximum buff travel of the operatively associated parts of our shock absorbing system. As the buff forces are removed from the coupler 32, the springs 58 and 59 of the draft gears 48 effect axial expansion of the latter whereby the follower 41 and the piston rod 38 are returned to the neutral position shown in FIGURE 1.

When the coupler member 32 is subjected to draft forces, the rear edge of the slot 34 in the coupler shank 33 pulls the draft key 35 forwardly against the forward edges of the slots 43 in the drawbars 42, thus moving the latter forwardly. As the drawbars 42 move forwardly, the radial flanges 47 secured thereto serve to axially compress the draft gears 48 against the follower 41. More particularly, the casings 49 of the rear draft gears 48 are urged toward the forward ends of the associated wedge blocks 53 by the radial flanges 47, and the casings 49 of the forward draft gears 48 are urged toward the forward ends of the associated wedge blocks 53 by the rear wedge blocks 53. Such axial forward movement of the casings 49 causes wedging engagement between the friction surfaces 52 and the wedge faces 56, and between the wedge faces 54 and 57, against the resistance of the springs 58 and 59. Again, the resultant combined spring and frictional resistance produced by this action in each draft gear unit 48 provides high shock absorbing capacity in draft.

In draft, the forward ends of the slots 31 formed in the leg portions of the frame assembly 22 are engageable by the leading edge of the draft key 35 for stopping and limiting forward movement of the latter. Thus, the longitudinal spacing between the leading edge of the draft key 35 and the forward edges of the slots 31 predetermines maximum draft travel of the operatively associated parts of our shock absorbing system. Since draft and buff travel are controlled independently, maximum draft travel relative to maximum buff travel can be varied to provide a wide range of desired shock absorbing characteristics. As the draft forces are removed from the coupler 32, the springs 58 and 59 of the draft gears 48 restore the parts of the latter to normal position which, in turn, urges the drawbars 42 and the draft key 35 rearwardly, thereby returning the system to the neutral position shown in FIGURE 1.

Those skilled in the art will recognize that in the preferred embodiment of our present invention, buff forces are absorbed by hydraulic shock absorbing means, and both buff and draft forces are absorbed by friction draft gear units. By arranging the hydraulic shock absorbing means and draft gears in parallel, our system will cushion high speed impacts of substantial magnitude. In addition, in the event of operational failure of the hydraulic shock absorbing unit 36 for any reason, the friction draft gears 48 are operable alone to cushion impact and draft forces, thereby insuring adequate cushioning of shocks at all times and under all circumstances. Finally, our shock absorbing system has been designed so that it may be readily installed in existing railway cars to increase the shock absorbing capacity thereof or in new railway cars under construction. In the case of existing railway cars the only modification required in the original structure is the addition of the openings 21 in the sill side walls 12 and 13.

While we have shown and described what we believe to be a preferred embodiment of our present invention, it will be understood by those skilled in the art that various modification and rearrangements may be made therein without departing from the spirit and scope of our invention.

We claim:

1. In a railway car, a longitudinally extending center sill, a transverse force transmitting member carried by and being longitudinally slidable relative to said sill, a hydraulic shock absorber disposed within said sill and having a hydraulic cylinder element and a hydraulic piston rod element, one of the elements of said hydraulic shock absorber having connection with said force transmitting member, coupler means engageable with said force transmitting member, a transverse draft key carried by and slidable relative to said coupler means and said sill, a pair of longitudinally extending drawbars one on each side of said sill, said drawbars extending through said force transmitting member with the forward ends thereof having connection with said draft key, reaction and support means for slidably receiving the rear ends of said drawbars, a force transmitting element carried by each drawbar, friction draft gear means carried by said drawbars intermediate of said force transmitting elements and said force transmitting member, said coupler means in response to buff forces applied thereto being engaged with said force transmitting member for moving the latter and said one element of said hydraulic shock absorber rearwardly for actuating the latter whereupon said hydraulic shock absorber serves to absorb the buff forces, said force transmitting member during rearward movement serving to compress said friction draft gear means against said force transmitting elements and said reaction and support means whereupon said friction draft gear means serve to cooperate with said hydraulic shock absorber in absorbing the buff forces, and said coupler means in response to draft forces applied thereto serving to move said draft key and said drawbars forwardly causing said force transmitting elements to compress said friction draft gear means against said force transmitting member whereupon said friction draft gear means serve to absorb the draft forces.

2. In a railway car, a longitudinally extending inverted generally U-shaped center sill with an open forward end, said center sill having an opening formed in each side wall thereof, a transverse force transmitting member being slidable in and projecting through said openings in said sill, a hydraulic shock absorber disposed within said sill and having a hydraulic cylinder and a forwardly projecting hydraulic piston rod, said hydraulic piston rod being connected to said force transmitting member, a coupler member extending into the open forward end of said sill with the inner end thereof engageable with said force transmitting member, said coupler member having a longitudinally extending transverse slot formed therein, said center sill having a longitudinally extending slot formed in each side wall thereof, a transverse draft key extending through and being slidable in said slots in said coupler member and said sill side walls, a pair of longitudinally extending drawbars one at each side of said sill, said drawbars extending through the opposite ends of said force transmitting member with the forward ends thereof having connection with said draft key, reaction and support means for slidably receiving the rear ends of said drawbars, a force transmitting element secured to each drawbar, friction draft gear means concentrically mounted on said drawbars intermediate of said force transmitting elements and said force transmitting member, said coupler member in response to buff forces applied thereto having its inner end engaged with said force transmitting member for moving the latter and said piston rod rearwardly for actuating said hydraulic shock absorber whereupon the latter serves to absorb the buff forces, said force transmitting member during rearward movement serving to compress said friction draft gear means against said force transmitting elements and said reaction and support means whereupon said friction draft gear means serve to cooperate with said hydraulic shock absorber in absorbing the buff forces, and said coupler member in response to draft forces applied thereto serving to move said draft key and said drawbars forwardly causing said force transmitting elements to compress said friction draft gear means against said force transmitting member whereupon said friction draft gear means serve to absorb the draft forces.

3. In a railway car, a longitudinally extending inverted generally U-shaped center sill with an open forward end, frame means secured within said center sill at a distance spaced from the forward open end of the latter, said center sill having an opening formed in each side wall thereof intermediate of said frame means and the open forward end of said sill, a transverse force transmitting member being slidable in and projecting through said openings in said sill, a hydraulic shock absorber disposed within said sill and having a hydraulic cylinder and a forwardly projecting hydraulic piston rod, said hydraulic cylinder having a rearward closed end disposed in abutment with said frame means, said hydraulic piston rod being connected to said force transmitting member, a coupler member extending into the open forward end of said sill with the inner end thereof engageable with said force transmitting member, said coupler member having a longitudinally extending transverse slot formed therein, said center sill having a longitudinally extending slot formed in each side wall thereof intermediate of said sill side wall openings and the open forward end of said sill, a transverse draft key extending through and being slidable in said slots in said coupler member and said sill side walls, laterally outwardly projecting bracket means secured to each side wall of said sill, a pair of longitudinally extending drawbars one at each side of said sill, said drawbars extending through the opposite ends of said force transmitting member with the rear ends thereof being slidably received in said bracket means, said drawbars at their forward ends being slotted to receive the ends of said draft key, flange means on each drawbar, a pair of friction draft gears concentrically mounted on each drawbar intermediate of said flange means and said force transmitting member, said coupler member in response to buff forces applied thereto having its inner end engaged with said force transmitting member for moving the latter and said piston rod rearwardly for actuating said hydraulic shock absorber whereupon the latter serves to absorb the buff forces, said force transmitting member during rearward movement serving to compress said draft gears against said flange means and said bracket means whereupon said draft gears serve to cooperate with said hydraulic shock absorber in absorbing the buff forces, and said coupler member in response to draft forces applied thereto serving to move said draft key and said drawbars forwardly causing said flange means to compress said draft gears against said force transmitting member whereupon said draft gears serve to absorb the draft forces.

4. In a railway car, a longitudinally extending inverted generally U-shaped center sill with an open forward end, frame means secured within said center sill at a distance spaced from the open forward end of the latter, said center sill having an opening formed in each side wall thereof intermediate of said frame means and the open forward end of said sill, a transverse force transmitting member being slidable in and projecting through said openings in said sill, a hydraulic shock absorber disposed within said sill and having a hydraulic cylinder and a forwardly projecting hydraulic piston rod, said hydraulic cylinder having a rearward closed end disposed in abutment with said frame means, said hydraulic piston rod being connected to said force transmitting member, a frame assembly secured in the forward end of said sill and having a collar portion defining an opening therein, said frame assembly having rearwardly extending side leg portions the inner ends of which are engageable by said force transmitting member for limiting forward movement of the latter, a coupler member extending through the opening in said collar portion with the inner end thereof engageable with said force transmitting member, said coupler member having a longitudinally extending transverse slot formed therein, said frame assembly leg portions each having a longitudinally extending slot formed therein, said center sill having a longitudinally extending slot formed in each side wall thereof intermediate of said sill side wall openings and the open forward end of said sill, a transverse draft key extending through and being slidable in said slots in said coupler member and said frame assembly leg portions and said sill side walls, a laterally outwardly projecting bracket secured to each side wall of said sill rearwardly of said hydraulic shock absorber, a pair of longitudinally extending drawbars one at each side of said sill, said drawbars extending through the opposite ends of said force transmitting member with the rear ends thereof being slidably received in said brackets, said drawbars at their forward ends being slotted to receive the ends of said draft key, a flange secured to each drawbar immediately forwardly of said brackets, a pair of friction draft gears concentrically mounted on each drawbar intermediate of said flange and said force transmitting member, said coupler member in response to buff forces applied thereto having its inner end engaged with said force transmitting member for moving the latter and said piston rod rearwardly for actuating said hydraulic shock absorber whereupon the latter serves to absorb the buff forces, said force transmitting member during rearward movement serving to compress said draft gears against said flanges and said brackets whereupon said draft gears serve to cooperate with said hydraulic shock absorber in absorbing the buff forces, and said coupler member in response to draft forces applied thereto serving to move said draft key and said drawbars forwardly causing said flanges to compress said draft gears against said force transmitting member whereupon said draft gears serve to absorb the draft forces.

5. The combination of claim 4 characterized by said coupler member having stop means engageable with said frame assembly collar portion for limiting rearward movement of said coupler member relative to said sill, and the forward edges of said slots in said frame assembly leg portions being engageable by the forward edge of said draft key for limiting forward movement of said coupler member relative to said sill.

6. In a railway car having a longitudinally extending center sill, coupler means at one end of said sill, a force transmitting member engageable by said coupler means, a hydraulic shock absorber disposed within said sill and having a hydraulic cylinder element and a hydraulic piston rod element, one of the elements of said hydraulic shock absorber having engagement with said force transmitting member, friction draft gear means arranged outboard of said sill and at one end thereof having engagement with said force transmitting member, drawbar means at one end being connected with said coupler means and at the other end having engagement with the other end of said friction draft gear means, said coupler means in response to buff forces applied thereto being engaged with said force transmitting member for moving the latter and said one element of said hydraulic shock absorber rearwardly for actuating the latter whereupon said hydraulic shock absorber serves to absorb the buff forces, said force transmitting member during rearward movement serving to compress said friction draft gear means whereupon the latter serves to cooperate with said hydraulic shock absorber in absorbing the buff forces, and said coupler means in response to draft forces applied thereto serving to move said drawbar means forwardly causing compression of said friction draft gear means whereupon the latter serves to absorb the draft forces.

7. In a railway car having a longitudinally extending center sill, coupler means at one end of said sill, a transverse force transmitting member engageable by said coupler means, a hydraulic shock absorber disposed within said sill and having a hydraulic cylinder element and a hydraulic piston rod element, one of the elements of said shock absorber having engagement with said force transmitting member, force transmitting means including a pair of drawbars outboard of said sill being connected with said coupler means, friction draft gear means on said drawbars and having engagement with said force transmitting member, said coupler means in response to buff forces applied thereto being engaged with said force transmitting member for moving the latter and said one element of said hydraulic shock absorber rearwardly for actuating the latter whereupon said hydraulic shock absorber serves to absorb the buff forces, said force transmitting member during rearward movement serving to compress said friction draft gear means whereupon the latter serves to cooperate with said hydraulic shock absorber in absorbing the buff forces, and said coupler means in response to draft forces applied thereto serving to move said force transmitting means forwardly causing compression of said friction draft gear means against said force transmitting member whereupon said friction draft gear means serve to absorb the draft forces.

8. In a railway car, a longitudinally extending center sill, a transverse force transmitting member carried by and being longitudinally slidably relative to said sill, a hydraulic shock absorber disposed within said sill and having a hydraulic cylinder element and a hydraulic piston rod element, one of the elements of said hydraulic shock absorber having engagement with said force transmitting member, coupler means engageable with said force transmitting member, a transverse draft key carried by and slidable relative to said coupler means and said sill, at least one longitudinally extending drawbar outboard of said sill, said drawbar extending through said force transmitting member with the forward end thereof having connection with said draft key, reaction and support means for slidably receiving the rear end of said drawbar, a force transmitting element carried by said drawbar, friction draft gear means carried by said drawbar intermediate of said force transmitting element and said force transmitting member, said coupler means in response to buff forces applied thereto being engaged with said force transmitting member for moving the latter and said one element of said hydraulic shock absorber rearwardly for actuating the latter whereupon said hydraulic shock absorber serves to absorb the buff forces, said force transmitting member during rearward movement serving to compress said friction draft gear means against said force transmitting element and said reaction and support means whereupon said friction draft gear means serves to cooperate with said hydraulic shock absorber in absorbing the buff forces, and said coupler means in response to draft forces applied thereto serving to move said draft key and said drawbar forwardly causing said force transmitting element to compress said friction draft gear means against said force transmitting member whereupon said friction draft gear means serves to absorb the draft forces.

References Cited in the file of this patent
UNITED STATES PATENTS

| | | |
|---|---|---|
| 2,810,484 | Campbell | Oct. 22, 1957 |
| 2,948,413 | Zanow | Aug. 9, 1960 |